United States Patent
Ma

(10) Patent No.: US 7,031,113 B2
(45) Date of Patent: Apr. 18, 2006

(54) METHOD AND APPARATUS FOR PROTECTING A MAGNETIC DISK WITHIN A CARTRIDGE FROM ELECTROSTATIC CHARGE

(75) Inventor: Yiping Ma, Layton, UT (US)

(73) Assignee: Iomega Corporation, San Diego, CA (US)

( * ) Notice: Subject to any disclaimer, the term of this patent is extended or adjusted under 35 U.S.C. 154(b) by 231 days.

(21) Appl. No.: 10/691,177

(22) Filed: Oct. 22, 2003

(65) Prior Publication Data

US 2004/0090700 A1  May 13, 2004

Related U.S. Application Data

(60) Provisional application No. 60/425,930, filed on Nov. 12, 2002.

(51) Int. Cl.
*G11B 17/02* (2006.01)

(52) U.S. Cl. .................................. 360/133; 720/737
(58) Field of Classification Search ............. 360/97.01, 360/133; 720/737, 719, 726, 728
See application file for complete search history.

(56) References Cited

U.S. PATENT DOCUMENTS

| | | | | |
|---|---|---|---|---|
| 3,864,755 | A * | 2/1975 | Hargis ...................... | 360/133 |
| 4,038,693 | A * | 7/1977 | Huffine et al. .............. | 360/133 |
| 4,485,421 | A * | 11/1984 | Hoshino .................... | 360/133 |
| 4,532,564 | A * | 7/1985 | Larson et al. ............ | 360/99.06 |
| 5,615,070 | A * | 3/1997 | Bordes ...................... | 360/133 |
| 6,034,841 | A * | 3/2000 | Albrecht et al. ......... | 360/97.01 |
| 6,490,242 | B1 * | 12/2002 | Bonn et al. ................. | 720/738 |
| 6,538,848 | B1 * | 3/2003 | Uwabo et al. .............. | 360/133 |
| 6,740,410 | B1 * | 5/2004 | Fahey et al. ............ | 428/411.1 |
| 6,809,903 | B1 * | 10/2004 | Bagnell et al. ............ | 360/133 |
| 6,898,798 | B1 * | 5/2005 | Hamaguchi ................ | 720/737 |
| 2002/0057522 | A1 * | 5/2002 | Bernett et al. ........... | 360/97.01 |

* cited by examiner

*Primary Examiner*—Jefferson Evans
(74) *Attorney, Agent, or Firm*—James T. Hagler

(57) ABSTRACT

An apparatus includes a removable cartridge having an information storage medium, and having a housing with the information storage medium movably supported therein. The housing is configured so that, if electrostatic charge is present on an exterior surface of the housing, the information storage medium will be substantially free of induced charge.

18 Claims, 1 Drawing Sheet

METHOD AND APPARATUS FOR PROTECTING A MAGNETIC DISK WITHIN A CARTRIDGE FROM ELECTROSTATIC CHARGE

This application claims the priority under 35 U.S.C. §119 of provisional application No. 60/425,930 filed Nov. 12, 2002.

TECHNICAL FIELD OF THE INVENTION

This invention relates in general to information storage cartridges and, more particularly, to techniques for avoiding a buildup of electrostatic charge on an information storage medium disposed in such a cartridge.

BACKGROUND OF THE INVENTION

Over the past twenty years, computer technology has evolved very rapidly. One aspect of this evolution has been a progressively growing demand for increased storage capacity in memory devices. In order to provide a high storage density at a reasonable cost, one of the most enduring techniques has been to provide a rotatable hard disk with a layer of magnetic material thereon, and a read/write head which is supported for movement adjacent the disk and can transfer information to and from the disk.

In an arrangement of this type, if airborne dust, smoke, vapors or other contaminants are present, they can be attracted to the disk by any electrostatic charge that may be present on the disk. Then, because the head is disposed closely adjacent to the disk during normal operation, the contaminants can be transferred to and progressively build up on the head. Eventually, the buildup of contaminants will be sufficient to interfere with the interaction between the head and disk, thereby increasing the error rate until the device will not operate.

In order to avoid this problem, most hard disk drives have the disk and head disposed within a sealed enclosure, so that the disk and head are not exposed to whatever airborne contaminants may happen to be present externally of the enclosure. This approach works well where the entire hard disk drive device is permanently installed in a computer. In other types of systems, however, a hard disk is provided within a removable cartridge, and it is desirable that the cartridge not include the read/write head.

In this regard, there are advantages to placing a head stack assembly (HSA) and its support structure within the drive which receives the cartridge, rather than in the cartridge. For example, a typical user will have several removable cartridges for each drive. Thus, in terms of overall system cost, it is cheaper to provide one head stack assembly with support which is in the drive, rather than to provide several head stack assemblies with support which are each disposed in a respective one of the many cartridges used with the drive. However, in removable cartridges, there is a problem in regard to keeping the head clean.

More specifically, in order to permit the head from the drive to access the disk within the cartridge, the cartridge is not provided with a sealed enclosure of the type discussed above. Instead, the cartridge is provided with an opening through which the head of the drive can be inserted into the cartridge. In some cases, a movable shutter is provided in order to obstruct the opening when the cartridge is not in the drive. However, when the cartridge is in the drive, the shutter moves to an open position. Thus, regardless of whether or not a shutter is present, when the cartridge is in the drive, there is an opening which gives the head access to the interior of the cartridge, and which also necessarily gives ambient air access to the interior of the cartridge, along with any dust, smoke, vapor or other contaminants that are carried by the ambient air.

Moreover, removable cartridges tend to be more susceptible to the effects of electrostatic charge. This is because, when a cartridge is not in a drive and is being manually handled, it is usually not in contact with any conductive material that can drain away charge that may build up on the exterior surface of the cartridge, and manual handling often has a tendency to cause a buildup of charge on the exterior surface of the cartridge housing. This charge on the exterior surface can in turn induce a buildup of charge within the housing, including a buildup of charge on the magnetic disk.

Consequently, since charge can build up on the disk and since the disk is exposed to contaminants in ambient air, the contaminants will tend to be attracted to and build up on the disk, and from there they will be transferred to and build up on the head during system operation. The effect of this contaminant buildup on the head can be ameliorated to some extent by keeping the storage density in the hard disk of a removable cartridge at a relatively low level, in comparison to the levels used for hard disks located within sealed enclosures. However, as mentioned above, the commercial marketplace is exhibiting a strong and progressively increasing demand for high-density storage in a removable cartridge.

SUMMARY OF THE INVENTION

From the foregoing, it may be appreciated that a need has arisen for techniques that are effective in reducing or avoiding the buildup of charge on an information storage medium disposed within a housing of information storage cartridge. One form of the present invention involves an apparatus having a removable cartridge which includes an information storage medium, and a housing with the information storage medium movably supported therein. The housing is configured so that, if electrostatic charge is present on an exterior surface thereof, the information storage medium will be substantially free of induced charge.

A different form of the invention involves a method of making a removable cartridge which includes a housing having an information storage medium movable supported therein. The method includes configuring the housing so that, if electrostatic charge is present on an exterior surface of the housing, the information storage medium will be substantially free of induced charge.

BRIEF DESCRIPTION OF THE DRAWINGS

An explanation of the present invention is provided in the detailed description which follows, with reference to the accompanying drawings, in which.

DETAILED DESCRIPTION

Figure 1:
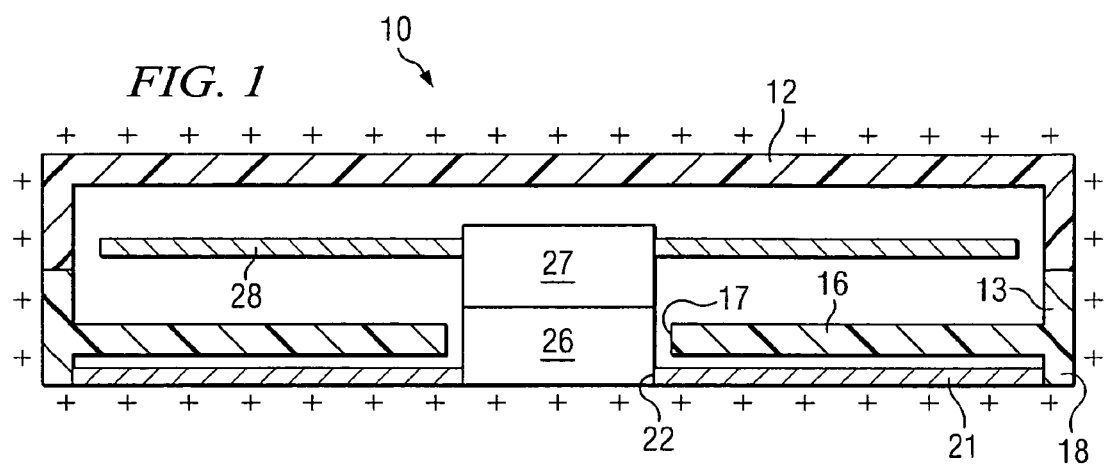
FIG. 1 is a diagrammatic central sectional view of an apparatus which is a removable information storage cartridge, and which embodies aspects of the present invention.

FIG. 1 is a diagrammatic central sectional view of an apparatus which is a removable information storage cartridge 10, and which embodies aspects of the present invention. The cartridge 10 has a housing which includes a top shell 12 and a bottom shell 13 that are fixedly coupled to each other. For example, the shells 12 and 13 may be coupled by not-illustrated screws, or in some other suitable manner. The shells 12 and 13 are each made of a dissipative plastic of a known type. However, the shells 12 and 13 could alternatively be made of a conductive plastic of a known type, or a conductive metal. The bottom shell 13 has a wall 16 with a central opening 17 through it. Further, the shell 13 has a circumferential projection 18, which extends downwardly from the peripheral edges of the wall 16.

An electrically conductive metal plate 21 has its peripheral edges fixedly secured in any suitable manner to the lower end of the circumferential projection 18. For example, the plate 21 can be secured to the projection 18 with a known epoxy adhesive which is electrically conductive, or by not-illustrated mechanical cooperation of the shell 13 and plate 21 which provides electrical conductivity between them. The top surface of the plate 21 is spaced from the bottom surface of the wall 16, and the plate 21 has a vertical opening 22 through a central portion thereof. The opening 17 through the bottom shell 13 is slightly larger than the opening 22 through the plate 21. In the embodiment of FIG. 1, the plate 21 is made of aluminum, but it would alternatively be possible to make the plate from some other electrically conductive material.

An electric motor 26 has its lower end fixedly mounted in the opening 22 through the plate 21, for example by a known epoxy adhesive which is electrically conductive, or by not-illustrated mechanical cooperation between the motor 26 and plate 21 which provides electrical conductivity between them. The motor 26 includes a hub 27, which is rotated by the motor 26. A circular disk 28 is fixedly mounted on the hub 27, so as to be concentric with the axis of rotation of the hub 27. It will be noted that the openings 17 and 22 are aligned with each other, and are aligned with the axis of the disk 28. The disk 28 is effectively disposed within a chamber in the housing of the cartridge 10. The disk 28 includes a rigid substrate which is not separately depicted, and which is made of a known material such as aluminum, glass, plastic, or embossed plastic. The disk 28 also includes, on one or both sides of the substrate, a layer of a known magnetic material which can store digital information.

The cartridge 10 can be removably inserted into a drive of a known type, which is not illustrated and described in detail. The drive has a not-illustrated movable arm, which supports a not-illustrated magnetic read/write head. The magnetic head can write information to and/or read information from the magnetic layer provided on one side of the disk 28. The housing defined by the shells 12 and 13 has a not-illustrated opening, which allows the magnetic head and a part of the arm to enter the housing when the cartridge 10 is inserted into the drive, so that the magnetic head can access the disk 28. Due to the presence of this opening, it is possible for airborne contaminants such dust and smoke particles to enter the cartridge 10.

When the cartridge 10 is not inserted in a drive, activity such as manual handling of the cartridge can cause electrostatic charge to build up on the exterior of the cartridge. In pre-existing cartridges, this static charge on the exterior of the housing can cause an inductive buildup of charge on the disk disposed within the cartridge. To the extent that charge forms on the disk of a pre-existing cartridge, it will attract airborne contaminates such as dust and smoke particles. These contaminants are then transferred to the read/write head during normal operation, where they will eventually produce errors in the data being written to and read from the disk, including nonrecoverable errors.

In contrast, in the cartridge 10 of FIG. 1, inductive charging of the disk 28 is avoided by the configuration of the housing, including the shells 12 and 13 and the plate 21. As a result, to the extent that any charge may develop on the exterior of the housing, it will not induce a formation of charge on surfaces of the disk 28. FIG. 1 diagrammatically shows an exemplary situation in which positive charge has developed on the exterior of the housing, as indicated by a plurality of "+" symbols. FIG. 1 also reflects that this positive charge on the exterior of the housing has not resulted in inductive charging of the disk 28. Consequently, the disk 28 does not have a charge which would tend to actively attract airborne particles that may enter the housing of the cartridge 10.

Figure 2:
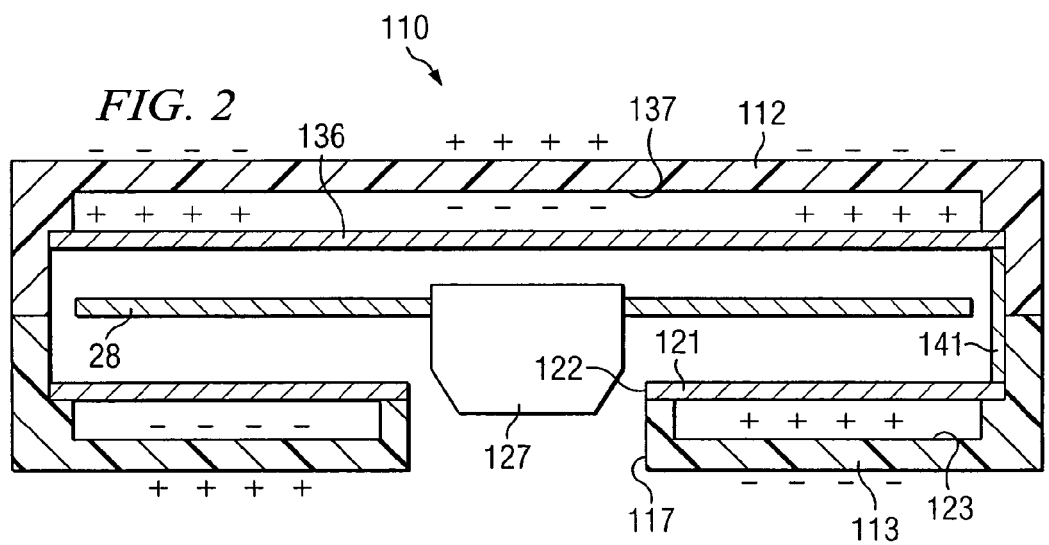
FIG. 2 is a diagrammatic central sectional view of a removable information storage cartridge which is an alternative embodiment of the cartridge of FIG. 1, and which embodies aspects of the present invention.

FIG. 2 is a diagrammatic central sectional view of a cartridge 110 which is an alternative embodiment of the cartridge 10 of FIG. 1. The following discussion focuses on differences between these two cartridges. In FIG. 2, the cartridge 110 has a housing which includes a top shell 112 and a bottom shell 113. These two shells 112 and 113 are each made from an electrically insulative plastic material, but could alternatively be made from some other type of insulative material. The bottom shell 113 has an opening 117 through a central portion thereof. An electrically conductive plate 121 is provided within the bottom shell 113.

In the embodiment of FIG. 2, the plate 121 is made from aluminum, but it would alternatively be possible to make the plate 121 from some other electrically conductive material. Moreover, the plate 121 could alternatively be made from a dissipative material. The plate 121 has a central opening 122, which is aligned with the central opening 117 through the shell 113. The bottom shell 113 has a shallow annular recess 123 which is disposed beneath the plate 121, so as to create a gap between the material of the plate 121 and the material of the shell 113.

The removable cartridge 110 does not include a motor. Instead, a motor is provided in the not-illustrated drive that can removably receive the cartridge 110. When the cartridge 110 is inserted into the drive, the motor of the drive can, through the openings 117 and 122, operatively engage and rotate a hub 127 provided within the housing of cartridge of 110. The disk 28 is mounted on the hub 127.

The cartridge 110 also includes an aluminum plate 136, which is electrically conductive, and which is provided within the top shell 112 near a top wall of the top shell 112, above the hub 127 and the disk 128. The plate 136 could alternatively be made of a dissipateive material. The top wall of the shell 112 includes a shallow recess 137, which creates a gap between the material of the shell 112 and most of the material of the plate 136. The plates 121 and 136 are electrically coupled by an aluminum coupling strip 141. Alternatively, the plates 121 and 136 could be electrically coupled in some other manner, for example by metal screws that also serve to secure the shells 112 and 113 to each other.

The configuration of the housing of cartridge 110 avoids a buildup of induced charge on the disk 28, even if static charge develops on the exterior of the housing. For example, as reflected by "+" and "−" symbols in FIG. 2, charge on the exterior of the housing can induce charge on the outer sides of the plates 121 and 136, but the region between the plates 121 and 136 will be protected from induced charge. Thus, the disk 28 will not develop any significant induced charge which would tend to attract airborne contaminants that could degrade or prevent proper operation of the cartridge 110.

Figure 3:
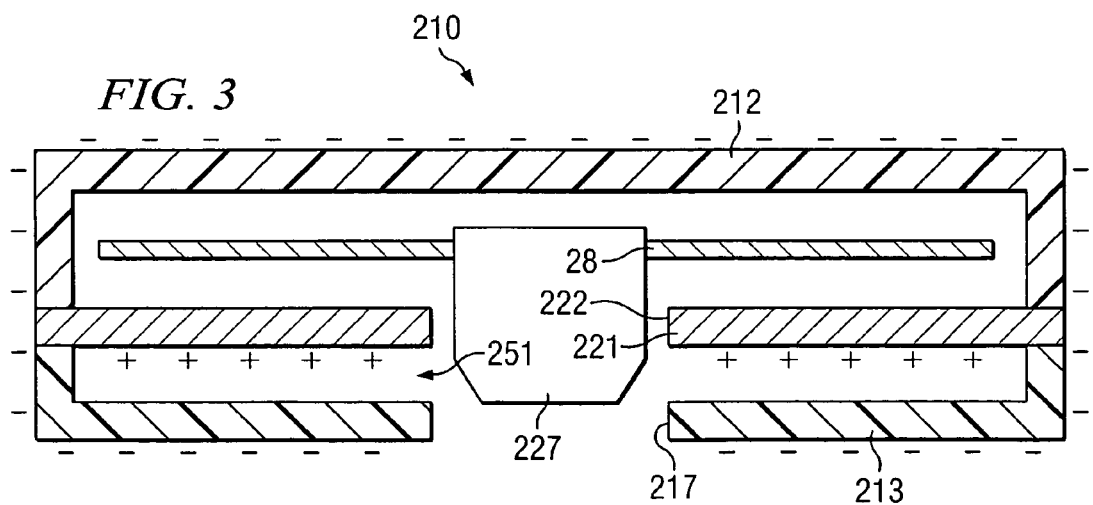
FIG. 3 is a diagrammatic central sectional view of a removable information storage cartridge which is a further alternative embodiment of the cartridge of FIG. 1, and which embodies aspects of the present invention.

FIG. 3 is a diagrammatic central sectional view of a cartridge 210 which is a further alternative embodiment of the cartridge 10 of FIG. 1. The following discussion addresses primarily the differences between the cartridges 10 and 210. The cartridge 210 has a housing which includes a top shell 212 and a bottom shell 213. The top shell 212 is made of an electrically dissipative material, such as a dissipative plastic, but could alternatively be made of an electrically conductive material. The bottom shell 213 is made of an electrically insulative material, such as an insulative plastic, and has an opening 217 through a central portion of a bottom wall thereof.

An electrically conductive plate 221 has a peripheral edge which is disposed between the top and bottom shells 212 and 213, and has an opening 222 through a central portion thereof. The plate 221 is made of aluminum, but could alternatively be made of some other electrically conductive material, or from a dissipative material. A hub 227 is rotatably disposed within the housing, and the disk 28 is fixedly coupled to the hub 227. When the cartridge 210 is removably inserted into a drive, a motor in the drive can operationally engage and effect rotation of the hub 227 and disk 28.

The housing of the cartridge 210 is configured so that, if an electrostatic charge builds up on the exterior thereof, it will not induce the formation of a charge on the disk 28. For example, FIG. 3 has "+" and "−" symbols which indicate one possible charge distribution. In particular, negative charge has built up on the exterior of the housing, and has induced a positive charge on the bottom side of the plate 221. However, the disk 28 is free of induced charge that would tend to attract airborne particles. A gap 251 is present below the underside of the plate 221 and above the bottom wall of the shell 213. To the extent that charge does happen to build up, charge present in the gap 251 will tend to attract dust and other airborne particles, thereby serving as a form of dust trap.

The present invention provides a number of advantages. One such advantage results from the provision of a removable information storage cartridge with a housing configured to minimize or avoid the formation of induced charge on an information storage medium disposed within the housing. This in turn reduces the extent to which the information storage medium will attract airborne contaminants that can in turn be transferred to and build up on a read/write head. As a result, the information storage medium can be used to reliably achieve higher storage densities.

Although selected embodiments has been illustrated and described in detail, it will be understood that various substitutions and alterations are possible without departing from the spirit and scope of the present invention, as defined by the following claims.

What is claimed is:

1. An apparatus comprising a removable cartridge which includes:
   an information storage medium; and
   a housing having said information storage medium movably supported therein, and configured so that, if electrostatic charge is present on an exterior surface of said housing, said information storage medium will be substantially free of induced charge, said housing comprising:
   a first portion conductively connected to a second portion, and
   a conductive plate attached to the first portion so that the conductive plate forms substantially the bottom of the housing and is insulated from the information storage medium.

2. An apparatus according to claim 1, wherein said information storage medium is a disk which is rotatably supported within said housing.

3. An apparatus according to claim 2, wherein said first and second portions each extend approximately parallel to said disk, which are each spaced from said disk in a direction normal to said disk, and which have a space therebetween, said first portion being made of a material which is one of electrically conductive and electrically dissipative.

4. An apparatus according to claim 3, wherein said first and second portions and the conductive plate of said housing each have an opening therethrough, said openings being aligned with each other and with an axis of rotation of said disk.

5. An apparatus according to claim 4, wherein said first portion is electrically conductive, and said second portion is disposed between said first portion and said disk.

6. An apparatus according to claim 5, wherein said second portion is made from one of an electrically conductive and an electrically dissipative material.

7. An apparatus according to claim 5, wherein said housing has a section which includes said second portion, which substantially completely surrounds said disk except for said opening through said second portion, and which is made from a material that is one of electrically conductive and electrically dissipative.

8. An apparatus according to claim 4, wherein said first portion is electrically conductive, and is disposed between said second portion and said disk.

9. An apparatus according to claim 8, wherein said housing has, on a side of said disk opposite from said first and second portions, third and fourth portions which each extend approximately parallel to said disk, which are each spaced from said disk in a direction normal to said disk, and which have a space therebetween, said third portion being made of a material which is electrically conductive.

10. An apparatus according to claim 9, wherein said housing has a fifth portion which electrically couples said first and third portions.

11. An apparatus according to claim 10, wherein said housing has a section which includes said second and fourth portions, which substantially completely surrounds said disk and said first and third portions except for said opening through said second portion, and which is made from a material that is electrically insulative.

12. An apparatus according to claim 4, wherein said first portion is disposed between said second portion and said disk, and is made of a material which is one of electrically conductive and electrically dissipative.

13. An apparatus according to claim 12, wherein said second portion is made from a material which is electrically insulative.

14. An apparatus according to claim 13, wherein said housing has a third portion which, together with said first portion, defines a section of said housing which substantially completely surrounds said disk except for said opening through said first portion, said third portion being made from a material which is one of electrically dissipative and electrically conductive.

15. An apparatus according to claim 14, wherein said second and third portions each engage said first portion but are free of engagement with each other.

16. An apparatus according to claim 4, including a motor fixedly mounted in said opening through one of said first and second portions and said conductive plate, said motor effecting said rotatable support of said disk within said housing.

17. An apparatus according to claim 1, including a motor fixedly mounted in said opening through said first portion through said conductive plate, said motor effecting said rotatable support of said disk within said housing.

18. An apparatus according to claim 17, wherein an inner edge at said opening through said second portion is spaced radially outwardly from said motor.

* * * * *